(12) United States Patent
Stroebel et al.

(10) Patent No.: US 7,726,005 B2
(45) Date of Patent: Jun. 1, 2010

(54) METHOD FOR MAKING AN ELECTROMAGNETICALLY EXCITABLE CORE OF AN ELECTRICAL MACHINE WITH A MULTIPHASE WINDING

(75) Inventors: Wolfgang Stroebel, Renningen (DE); Helmut Scheiffele, Schwaikheim (DE)

(73) Assignee: Robert Bosch GmbH, Stuttgart (DE)

( * ) Notice: Subject to any disclaimer, the term of this patent is extended or adjusted under 35 U.S.C. 154(b) by 536 days.

(21) Appl. No.: 10/879,870

(22) Filed: Jun. 29, 2004

(65) Prior Publication Data

US 2004/0261255 A1    Dec. 30, 2004

(30) Foreign Application Priority Data

Jun. 30, 2003    (DE) .................... 103 29 572

(51) Int. Cl.
H02K 15/00    (2006.01)
H02K 1/00    (2006.01)

(52) U.S. Cl. .................. 29/596; 29/564.5; 29/605; 310/179

(58) Field of Classification Search .............. 29/606, 29/596, 598, 609, 605, 628; 310/184, 179, 310/254, 217, 156, 218, 216
See application file for complete search history.

(56) References Cited

U.S. PATENT DOCUMENTS

| 4,206,621 | A | * | 6/1980 | Kawasaki et al. ............ 72/130 |
| 4,351,102 | A | | 9/1982 | Grozinger et al. |
| 4,365,180 | A | * | 12/1982 | Licata et al. ................. 310/216 |
| 4,692,645 | A | * | 9/1987 | Gotou ......................... 310/184 |
| 4,864,716 | A | | 9/1989 | Yaginuma et al. |
| 5,592,731 | A | * | 1/1997 | Huang et al. .................. 29/596 |
| 5,734,209 | A | * | 3/1998 | Hallidy ........................ 310/12 |
| 6,281,612 | B1 | * | 8/2001 | Asao et al. ................... 310/179 |
| 6,317,962 | B1 | * | 11/2001 | Adachi et al. ................. 29/596 |
| 6,417,592 | B2 | * | 7/2002 | Nakamura et al. ............ 310/184 |
| 2003/0071534 | A1 | * | 4/2003 | Kreuzer et al. ................. 29/596 |

FOREIGN PATENT DOCUMENTS

| DE | 100 56 794 A1 | 5/2002 |
| EP | 1 174 982 A2 | 1/2002 |
| WO | 01/54254 A1 | 6/2001 |

* cited by examiner

*Primary Examiner*—Minh Trinh
*Assistant Examiner*—Tai Nguyen
(74) *Attorney, Agent, or Firm*—Michael J. Striker (57) ABSTRACT

The method of making an electromagnetically excitable core of an electrical machine with a multiphase winding (13) includes preparing a core (10) having a substantially parallelepiped shape, which is provided with a plurality of parallel grooves (N1 to N36; N1 to N48) in one side in a first step. In at least one subsequent step at least three phase windings (100, 200, 300) are laid in these grooves in such a manner that only one winding overhang is outside of the core.

9 Claims, 10 Drawing Sheets

METHOD FOR MAKING AN ELECTROMAGNETICALLY EXCITABLE CORE OF AN ELECTRICAL MACHINE WITH A MULTIPHASE WINDING

CROSS-REFERENCE

The invention described and claimed hereinbelow is also described in 103 29 572.0, filed Jun. 30, 2003. This German Patent Application, whose subject matter is incorporated here by reference, provides the basis for a claim of priority of invention under 35 U.S.C. 119 (a)-(d).

BACKGROUND OF THE INVENTION

The present invention relates to a method of making an electro-magnetically excitable core of an electrical machine with a multiphase winding, especially a stator of an alternator, and, more particularly, to a method of making an electromagnetically excitable core of an electrical machine with a multiphase winding, in which a core having a substantially parallelepiped shape is provided with a plurality of grooves in one side spaced from each other along the core, and at least three phase windings are laid in the grooves of the core.

A method of making an electromagnetically excitable core with a multiphase winding is disclosed in International Patent Publication WO 01/54254 A1, in which a core having a substantially parallelepiped shape is prepared, which has a plurality of grooves in one side spaced from each other along the core, and at least three phase windings are laid in respective grooves of the core. When the three phase windings are constructed as a so-called simple lap winding, an approximately wedge-shape opening or recess of the winding ends is formed on both sides at the joint between the ends of the core after bending the core with the multiphase winding. These wedge-like openings or recesses on the periphery of the stator produce a passage for cooling air, which can lead to undesirable noise under some circumstances.

SUMMARY OF THE INVENTION

It is an object of the present invention to provide a method for making an electromagnetically excitable core of an electrical machine with a multiphase winding, especially a stator of an alternator, which does not have the above-described disadvantage.

This object and others which will be more apparent hereinafter are attained in a method of making an electromagnetically excitable core of an electrical machine with a multiphase winding, especially a stator of an alternator, in which a core having a substantially parallelepiped shape is prepared, which has a plurality of grooves in one side spaced from each other along the core, and in which at least three phase windings are laid in certain grooves of the core.

According to the invention the at least three phase windings are laid in the grooves of the core so that only one winding overhang is located outside the core.

Because of the arrangement of the phase windings according to the invention the approximately wedge-shaped opening of the prior art core can be at least partially closed. This has the effect that the stator-dependent noise generation caused by the flowing cooling air is significantly reduced.

Features of the preferred embodiments are described hereinbelow. When one of the phase windings is constructed so that the winding overhang of this phase winding includes only one part of the coil sides provided for the corresponding groove, the winding overhang may be inserted comparatively simply into the appropriate groove on bending the core with the winding. The manufacturing process is thus simply formed, the danger of manufacturing interruptions and the danger of defects in the winding due to the manufacturing method are clearly reduced.

According to another embodiment of the invention it is provided that all phase windings are wound equally. One of the phase windings with first coil sides is inserted in one groove, which is spaced electrically from the first groove of the core about 240 degrees. A complete winding overhang thus results from a phase winding. Because of that in contrast to the previous embodiments of the invention all phase windings are equal, the manufacturing process for the individual phase windings is reduced to only one type of manufacturing process, the manufacturing process is clearly simplified and costs are considerably reduced.

Furthermore according to a further embodiment at least three phase windings are constructed as a single layer phase winding. These single layer lap windings may be made simply.

For example the three phase windings are arranged in three different planes of the electromagnetically excitable core. To simplify manufacturing, i.e. to simplify insertion of the winding overhang, it is provided that the phase winding is laid with the winding overhang closest to the groove slot.

According to another preferred embodiment the phase windings are wound from a multiple wire. This means that a so-called simple wire is not used, which is wound around a winding mold, but several wires are used, whose diameter is reduced in comparison to the diameter of an individual wire. Because of that the bending forces during manufacture of the individual phase windings are reduced and thus the forces applied to the wires are not too large. The smaller the loads on the multiple wire, the smaller the danger of manufacturing errors during the forming of the individual phase windings. According to another preferred embodiment it is provided that all phase windings are pressed into a mold prior to insertion in the core and thus the coil sides provided for each groove are shaped jointly in a predetermined groove shape. This means that not every individual phase winding is laid by itself in the core, but all three phase windings are laid together in the mold and after shaping are inserted together in the electromagnetically excitable core, i.e. in its grooves. This again simplifies the manufacturing process, since the three windings need not be inserted one after the other in the core, but this process can be completed in a single insertion step.

According to another preferred embodiment of the invention the shaping groove of the mold includes a groove slot. This means that the total cross-section of the coil sides in the mold is not only pressed in the shaping groove between yoke back and the undersides of the teeth ends, but that the wires to be pressed are shaped so that they can at least partially fill even the groove slot in the electromagnetically excitable core. This has the result that the stator made in this process can have increased groove filling, since now also the wires can be laid in the groove slot.

Finally in other preferred embodiments the radially innermost wires of the winding act as groove closure means for the radially further outer wires in the case of a circular core.

BRIEF DESCRIPTION OF THE SEVERAL VIEWS OF THE DRAWING

The objects, features and advantages of the invention will now be illustrated in more detail with the aid of the following description of the preferred embodiments, with reference to the accompanying figures in which.

DETAILED DESCRIPTION OF THE INVENTION

Figure 1:
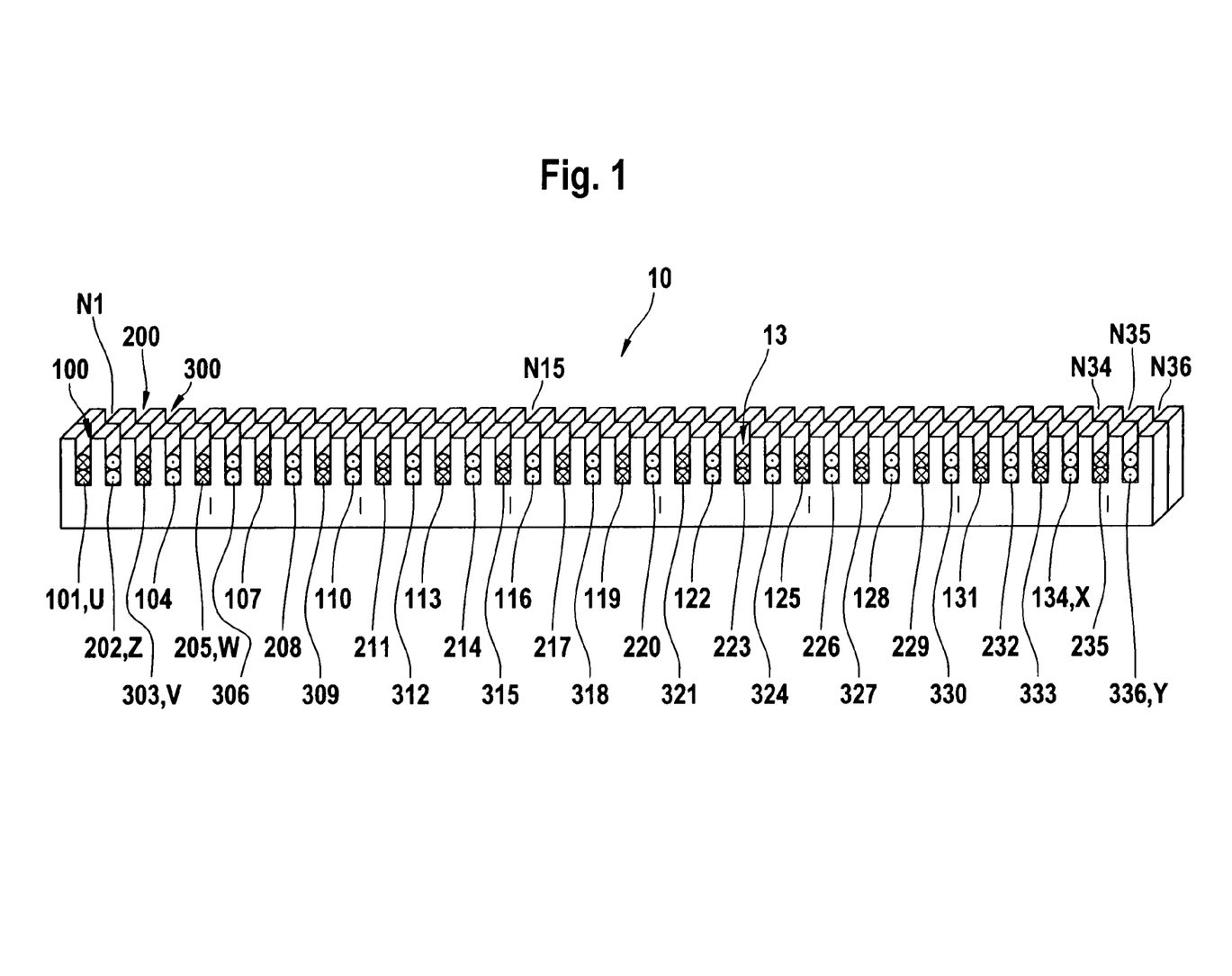
FIG. 1 is a perspective view of a core showing the principal positions of the coil sides of the windings in the grooves of the core.

FIG. 1 is a schematic perspective view of an electromagnetically excitable core 10, which is provided for an electrical machine. An alternator for a motor vehicle is a preferred embodiment of the electrical machine. A multiphase winding 13 is used in this core 10. This multiphase winding 13 is embodied as a so-called three-phase winding as shown in FIG. 1.

Figure 2:
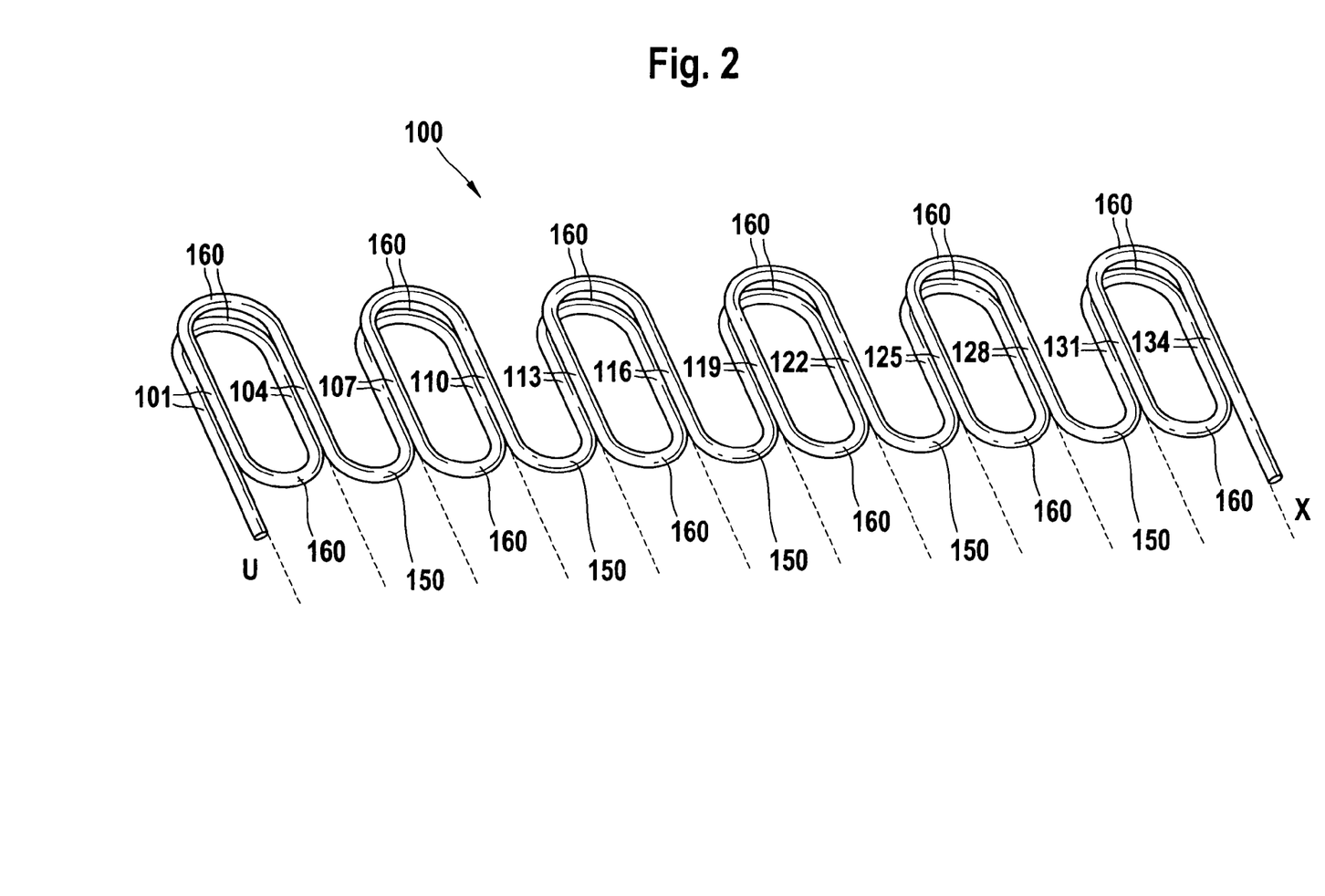
FIG. 2 is a perspective view of a first phase winding.

The first phase winding 100 includes both the coil sides 101 to 134 shown in FIG. 1, and also the coil side connectors 150 not shown in FIG. 1 and the coil side connectors 160, see FIG. 2. The beginning and ending of the first phase winding 100 are indicated with the alphabetic reference characters U and X, as usual.

Furthermore the second phase winding 200 is shown in FIG. 1 similarly with the coil sides 202 to 235 and the third phase winding 300 is shown with the coil sides 303 to 336. The coil sides 101 to 336 are inserted in the grooves N1 to N35 of the core 10. The designation of these grooves relates to their position from the left end of the core 10 shown in FIG. 1. Moreover the reference numbers designating the coil sides include a first digit that designates the respective winding of the corresponding coil side and following two digits that designate the groove in which the coil side is laid. In other words the coil side 101 is part of the first phase winding and is laid in groove N1.

Figure 3:
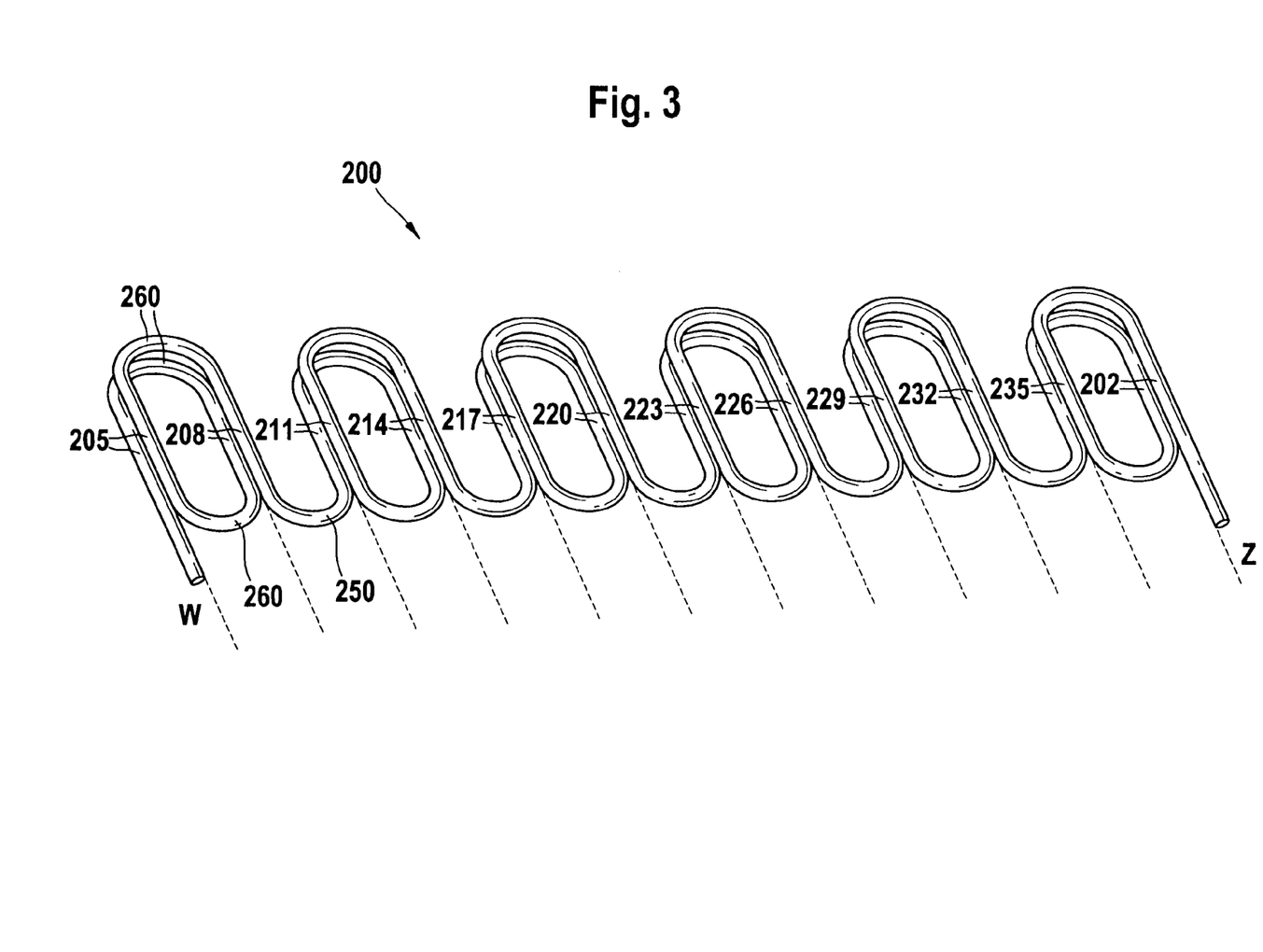
FIG. 3 is a perspective view of a second phase winding.
Figure 4:
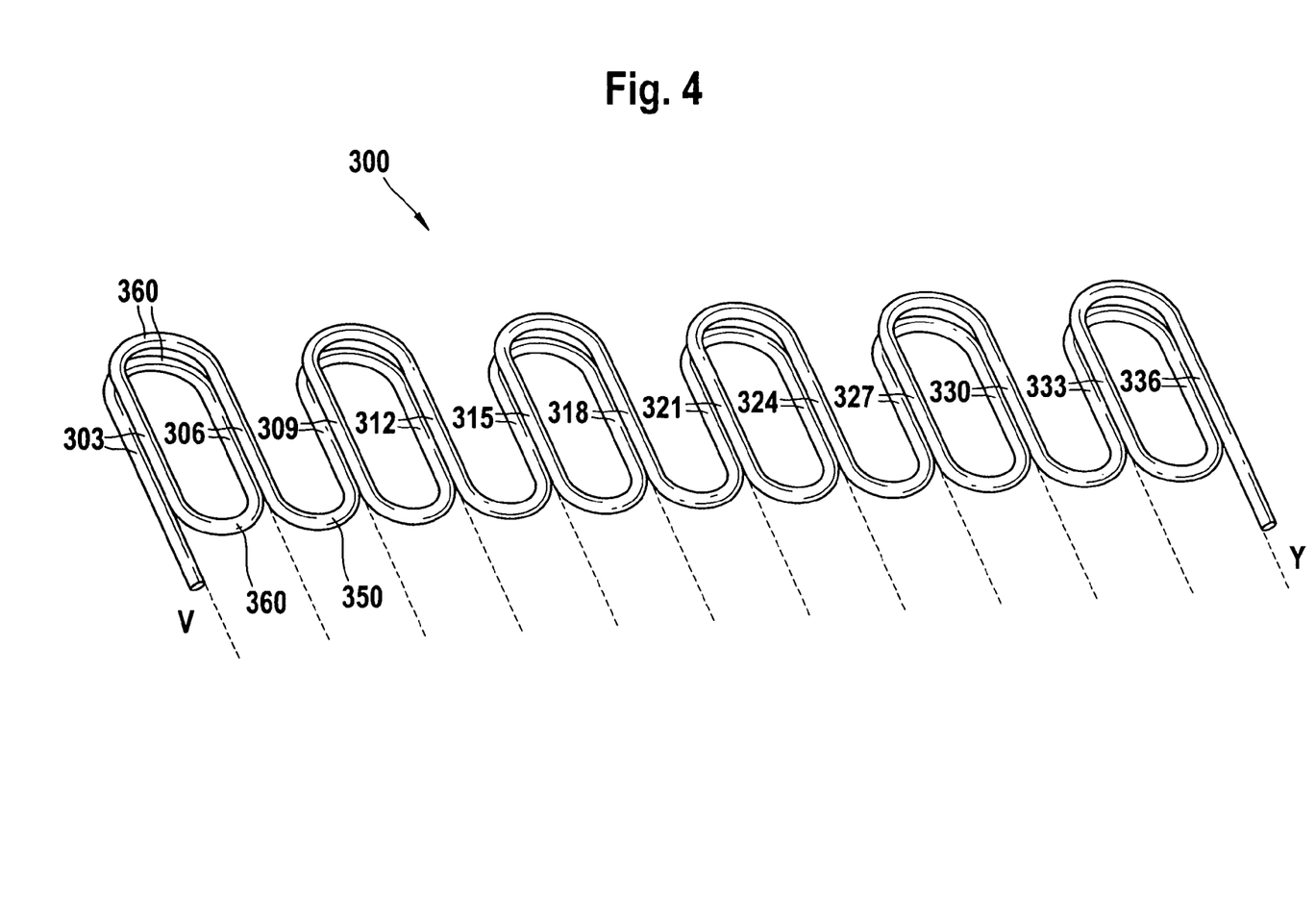
FIG. 4 is a perspective view of a third phase winding.

The phase windings 100, 200 and 300 of this first embodiment are all constructed equally, i.e. they have the same structure. This means that a respective first coil side 101, 205 or 303 connected to a winding end U, W or V is connected with a corresponding coil side connector 160, 260 or 360. The corresponding coil side connector 160, 260 or 360 is, in turn, connected with a respective further first coil side 104, 208 or 306. The appropriate number of coil side connectors and further coil sides corresponds to the number of coils wound for each pole. For each pole of a phase winding 100, 200 or 300, the appropriate number of coils, which are wound, are connected with respective coil connectors 150, 250 or 350, in order to connect them with further coils units. If, as shown in the illustrated example, a 12-pole winding 13 is illustrated, a total of six coils for each phase winding 100, 200 or 300 are connected with each other by means of the coil connectors 150, 250 or 350. The phase windings 100, 200 or 300 have winding ends X, Z or Y. The corresponding illustration of the complete phase windings 100, 200 or 300 are shown in FIGS. 2, 3 and 4.

FIG. 1 shows the positions of the individual coil sides of the individual phase windings 100, 200 or 300 in a circular stator, which is shown in an extended configuration for simplicity.

The crosses and/or dots in the symbolic representation of the coil sides are a symbolic representation of the current flow in this multiphase winding 13 and/or the electromagnetically excited core 10.

Figure 5:
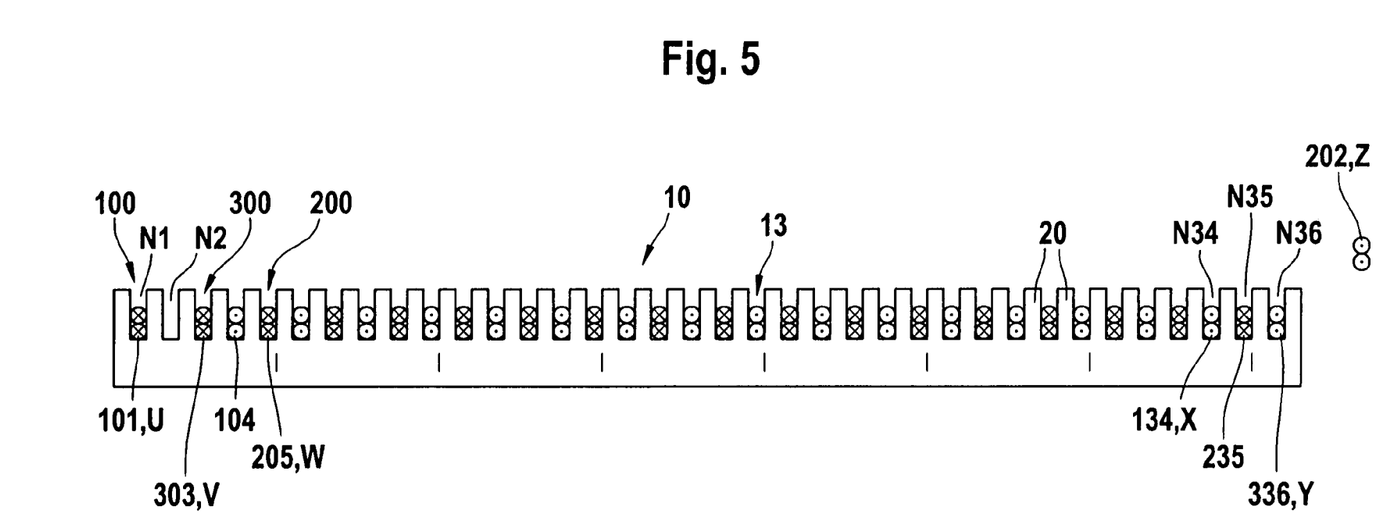
FIG. 5 is a side view of a first embodiment of the core with an inserted winding in a first embodiment.

FIG. 5 shows the arrangement of the phase windings 100 in the still flat core prior to bending of it together with the multiphase winding 13. In a first method step the core 10 with the substantially parallelepiped shape is prepared for the winding. In at least one following step the at least three phase windings 100, 200 or 300 are laid in parallel grooves N1 and N3 to N36. The reference numbers selected in FIG. 5 correspond to the reference numbers of FIG. 1. The coil side 202 and/or the winding end Z of the second phase winding 200 does not lie in the groove N2 designed for this coil side 202. Furthermore this coil side 22 with the winding end Z is not in the core 10 and in a plane, which is above the teeth and thus above the free ends of the teeth. This coil side 202 is first laid in the groove N2 during the bending of the core 10 with the multiphase winding 13 (see also FIG. 6).

Figure 6:
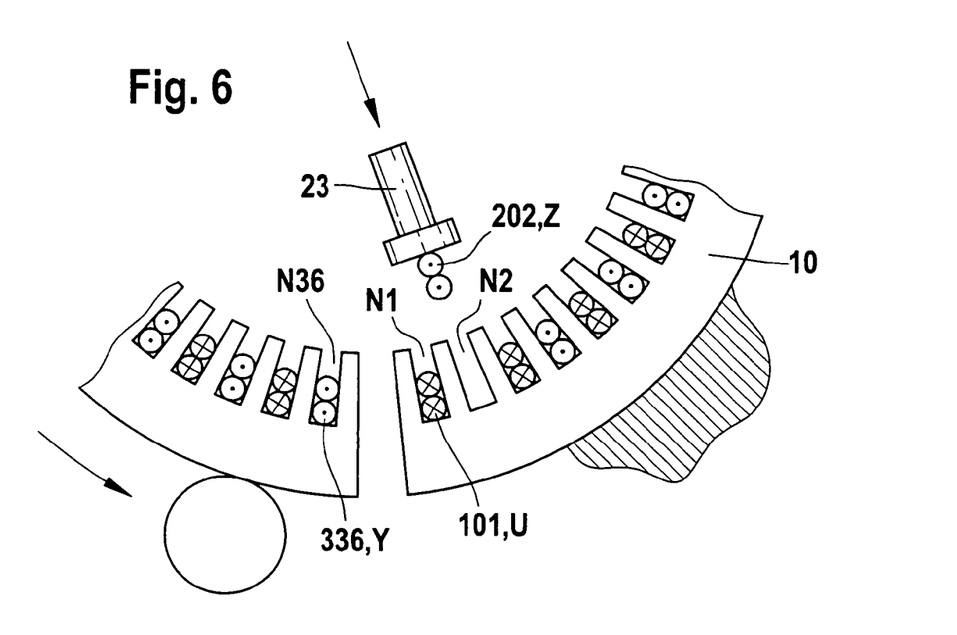
FIG. 6 is a plan view showing the method by which a winding overhang is pushed into a groove.

FIG. 6 shows the step of bending the core 10 with the three-phase winding 13 shortly prior to finishing the bending process. A ram 23 for inserting the coil side 202 into the groove N2 provided for it is also shown. After the ram 23 has pushed the coil side 202 into the groove N2 the core 10 with the winding 12 is subsequently bent, since it is turned in a counterclockwise direction, as shown in FIG. 6.

To start the bending process of the core 10 with the winding 13 in a first step the groove N1 is bent into the provided final form of the circular core 10 with the winding 13. The same can occur for the groove N36. The insertion of the coil side 202 into the groove N2 occurs only when the groove N2 is still completely open.

This above-described embodiment of the method of making an electromagnetically excitable core 10 of an electrical machine with a multiphase winding 13 comprises a first process step in which a core 10 with a parallelepiped shape is prepared, which has grooves extending parallel to each other. In the next or subsequent step at least three phase windings 100, 200, 300 with their coil sides are laid in respective grooves of the core 10. The at least three phase windings 100, 200, 300 are thus laid in certain grooves of the core 10 so that only one winding overhang formed from one or more coil sides 202 is outside the core 10.

Thus at least three phase windings 100, 200 and 300 are wound as single layer coil windings.

The preferred step sequence, with which the at least three phase windings 100, 200 and 300 are laid in the core 10, is that the phase winding 200 having the winding overhang is next laid in the groove slot and thus between the free ends of the teeth. This means that next the phase winding 100 and subsequently the coil sides of the second phase winding 200 are laid in the grooves N5 to N35. So that the coil side connector 260 of the last coil with the winding end Z is formed especially long, the phase winding 200 can be laid also as the first or second phase winding in the core 10. Alternatively the step sequence between the phase winding 100 or 300 can be interchanged.

According to a further embodiment it is provided that only one part of the coil around a pole is formed as a winding overhang. Moreover both the first phase winding 100 and the third phase winding 300 are laid in the grooves N1 to N36 in the core 10. The first phase winding 100 corresponds to the embodiment described in FIG. 2; similarly the same goes for the third phase winding 300, which is formed as described in FIG. 4. The second phase winding 200 is however formed differently, as seen from FIG. 7.

Figure 7:
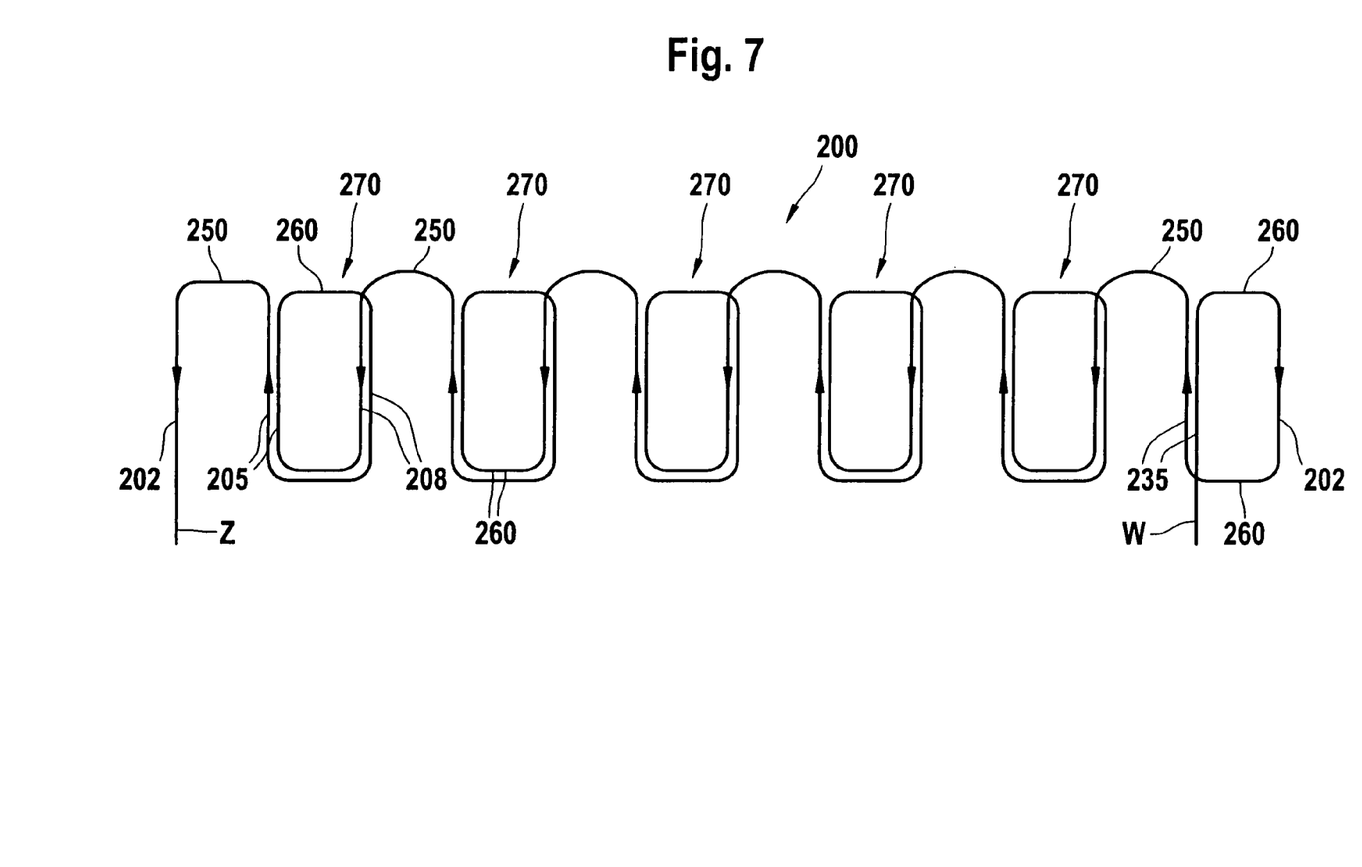
FIG. 7 is a perspective view of a second embodiment of the second phase winding.

The phase winding 200 starts with a coil side 202, which is connected in one piece with a coil connector 250. The coil connector 250 connects this first coil side connector 202 with following coils, which comprise coil sides 205 and 208, which are connected to the following coils by means of coil side connectors 260. According to the number of coil sides the winding scheme continues with an additional coil connector 250 and subsequently connected coils 270. For a two-poled system this means in this phase winding 200, that a total of five complete coils 270 are arranged following each other, each connected by respective coil connectors 250. An additional coil connector 250, which is connected to a first coil side 235 and to a coil side connector 260 connected with the first coil side 235, is connected to the last coil 270, which is provided for grooves N29 and N32. This coil side connector 260 follows a coil side 202, which is laid in the groove N2. A coil side connector 260 is subsequently connected to this coil side 202. A further coil side 235 is connected to this latter coil side connector 260 following it. This further coil side 235 ends with the phase connector W. Both coil sides 235 are similarly laid in the groove N35.

The first coil side 202, which ends or begins with the phase connector Z, which is part of the coil side 202, is connected to first coil 270 of this phase winding 200 by coil connector 250. The coil side 202, which immediately follows the phase connector Z of the phase winding 200, forms a first physical end of the phase winding 200. The remaining part of the coil sides of the first coil of this phase winding 200, i.e. the coil side 202, which forms the first coil 270 together with the coil sides 235, form a second physical end of this phase winding 200. In the extended configuration of this phase winding 200 the first physical end is put against the second physical end of this phase winding. The second physical end of the phase winding 200, namely the flat coil side 202 found near the winding end W, subsequently forms the winding overhang, which later is found in the appropriate groove N2 in the course of the bending process.

Figure 8:
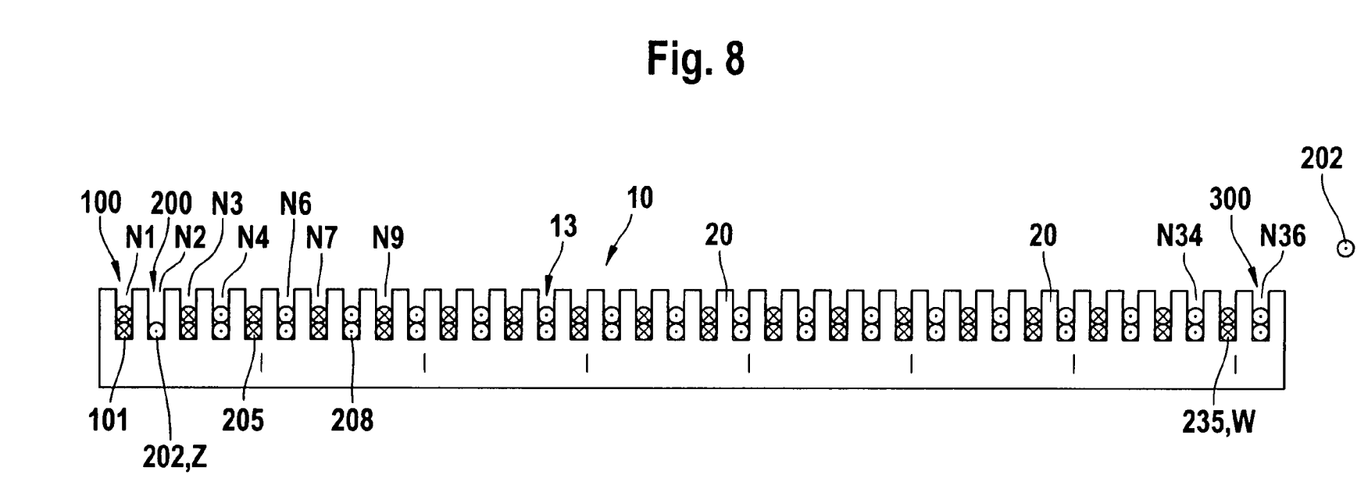
FIG. 8 is a side view of a second embodiment of the core with an inserted winding with the second phase winding according to the second embodiment.

FIG. 8 shows the arrangement of the three phase windings 100, 200, 300 in the core 10. In the above-described embodiment first the phase winding 100 is laid in the core 10. First the winding is laid in grooves N1, N4, N7, etc. until at N34. Then the phase winding 300 is laid in the grooves N3, N6, N9 etc. until at N36. Subsequently the other phase winding 200 from FIG. 7 is laid in the grooves N2, N5 etc until at N35. The coil side 202, which forms the second physical end of the phase winding 200, lies outside the grooves of the core 10 and above the plane of the groove openings and/or the teeth ends 20. The first coil sides 101 of the first phase winding 100 are laid in groove N1. One part of the coil sides 202 of first coil 270 of the phase winding 200 is laid in another groove, which is displaced electrically about 60 degrees from the groove N1. This part of the coil sides 202 of the first coil 270 forms a first physical end of the other phase winding 200. The remaining part of the coil sides 202 of the first coil 270 of the other phase winding 200 is laid in the same groove as the first part of the coil sides 202 of the first coil 270. The remaining part of the coil sides 202 of the first coil 270 form a second physical end of the other phase winding 200. If the core 10 with the winding 13 illustrated in FIG. 8 is bent around as shown in FIG. 6, the ram 23 need only push the still remaining part of the coil sides 202 of the first coil 270 of the phase winding 200 into the groove N2.

Generally the first coil sides of a phase winding can be laid in a first groove and a part of the coil sides of a first coil of another phase winding can be laid in another groove, which is displaced from the first groove by 60 electrical degrees. This part of the coil sides of the first coil forms a first physical end of the other phase winding. The remaining part of the coil sides of the first coil of the other phase winding are laid in the same groove and this remaining part of the coil sides of the coil form a second physical end of the other phase winding.

Figure 9A:
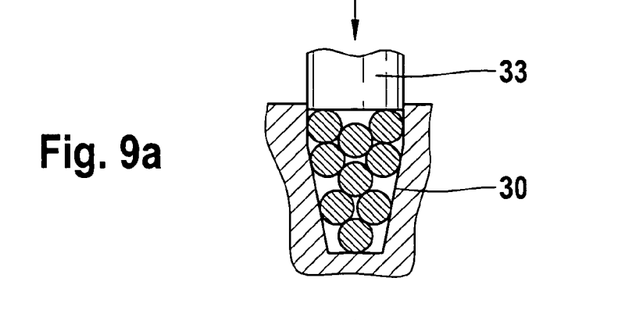
FIGS. 9a, 9b and 9c are respective cross-sectional views of a mold in which coil sides are pressed in corresponding steps of the method for making the electrically excitable core according to the invention.
Figure 9B:
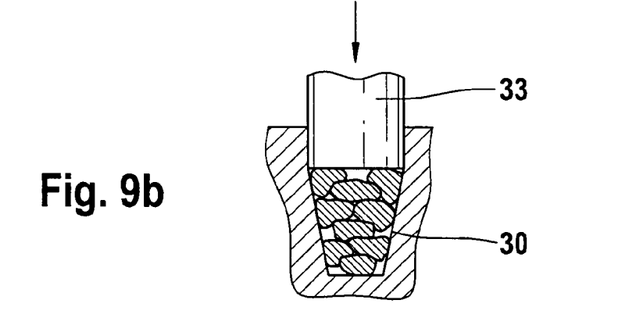
Figure 9C:
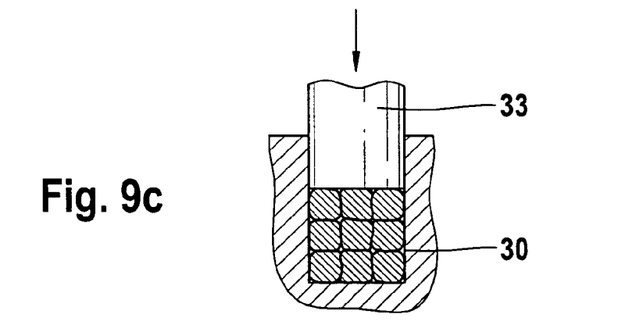

As already mentioned above, the phase windings 100, 200 and 300 are arranged in one method step so that they can be laid together in the core 10. Especially these three-phase windings should be shaped with a pressing tool, by which the coil sides of the three phase windings are pressed, so that they are adjusted to a shaping groove 30, as seen in FIGS. 9a and 9b. The coil sides, which are for example circular in cross-section and subsequently are pressed by ram 33, are laid in the shaping groove 30. The unshaped coil sides are adjusted or shaped so that they take the shape of the grooves in the circular core 10 after it is bent. The shaping groove 30 can be trapezoidal in shape or rectangular as shown in FIG. 9c.

Figure 10:
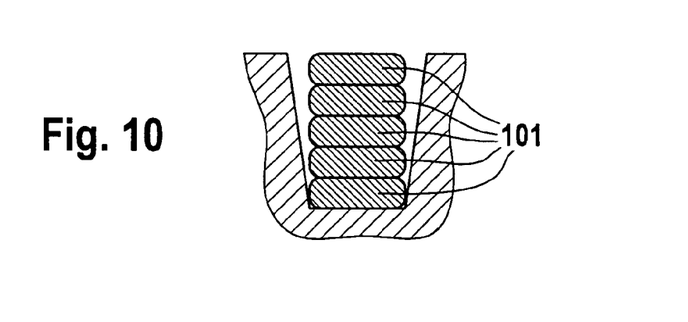
FIG. 10 is a cross-sectional view of a group of rectangular wire sections in a groove of the core prior to bending.

Another example is shown in FIG. 10, in which a pre-shaped wire is provided for making the phase winding. In this example the wire has a substantially rectangular cross section.

Figure 11:
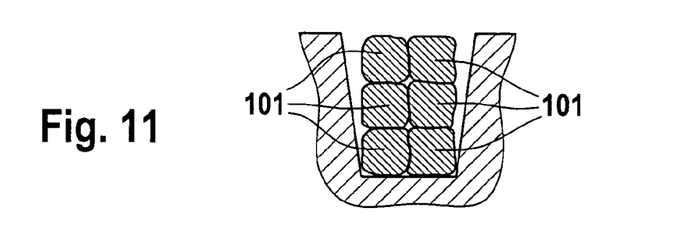
FIG. 11 is a cross-sectional view of a multiple wire in a rectangular groove of the core prior to bending.

FIG. 11 shows a further embodiment, in which a so-called multiple wire is employed for the phase windings. The term "multiple wire" means that two parallel side-by-side wires are simultaneously wound so that they produce e.g. the first phase winding 100. In FIG. 11 the coil sides 101 of the first phase winding are shown.

Figure 12A:
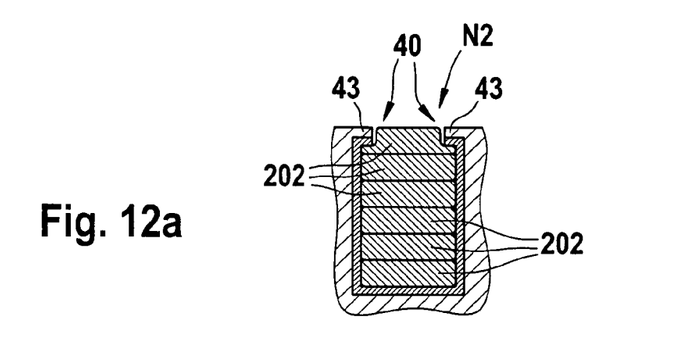
FIGS. 12a and 12b are respective cross-sectional views through coil sides with corresponding special stamped interior wire configurations.

FIG. 12a shows the groove N2 of the core 10. This groove N2 is, like the other grooves of the core 10, rectangular in this case. Also in this case the coil sides 202 are pressed into a mold prior to laying them in the core 10. In this case the first coil sides 202 are pressed so that indentations 40 are formed in it in the circumferential direction of the circular core 10 so that the coil sides 202 are retained in the groove N2. The already mentioned indentations 40 are in braced or urged against so-called tooth-head cover strips 43 in a radial direction. This arrangement eliminates the need for a so-called groove closure, which holds the coil sides securely in the groove. On the other hand, this permits the use of the intervening space between the cover strips 43, so that the groove-filling factor of each groove can be improved thereby. In FIG. 12a a rectangular wire is used for the wire to be wound.

Figure 12B:
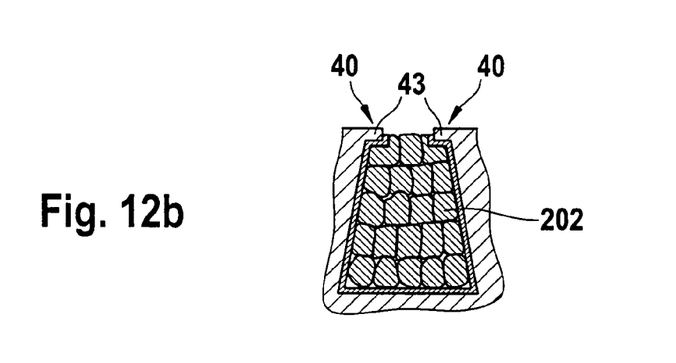

In FIG. 12b the wire of the coil sides 202 has a round cross-section. In this case the shaping groove has a trapezoidal shape. Also these coil sides 202 of a winding 200 were pressed in their entirety in a mold so that the first wire section of the winding 200 has a total of two indentations, which are engaged by the tooth-head cover strips 43 to hold the coil sides in the groove.

The groove and/or tooth shapes in the core 10 can be such that the groove is trapezoidal and the teeth are parallel. This sort of embodiment is especially suitable for round wires. For profiled or shaped wires, especially rectangular wires, the combination of trapezoidal teeth with parallel-sided grooves is especially suitable.

Furthermore groove covers can be eliminated when rectangular profiled wires are used with a suitably formed groove liner. The latter profiled wire rests in the groove opening braced on the groove liner, which extends to the teeth back, so that it extends until under the tooth cover strips.

An especially good cooling of the winding ends, formed from the coil side connectors, results when the coil side connectors are made so that they do not rest directly on each other and thus cooling air can enter between them. After winding the individual phase windings 100, 200 or 300 the wire ends U, V, W or X, Y, Z are stripped of insulation and shortened to the required lengths.

Figure 13:
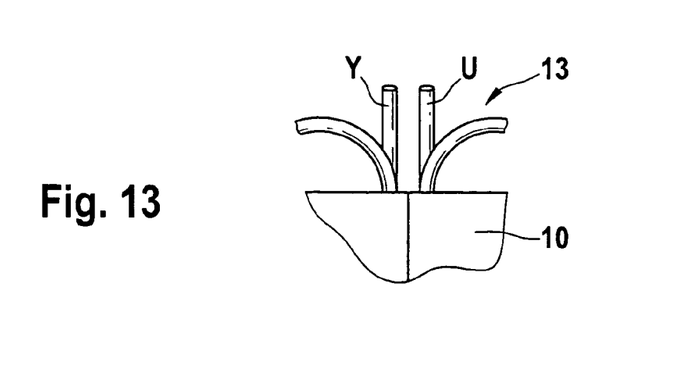
FIG. 13 is a view of a core with windings in the vicinity of the gap at the joint according to the prior art.

In FIG. 13 the joint of the circular core 10 is shown with multiphase winding 13, which is similar to that which results when the circular core 10 with the multiphase winding 13 known from the prior art is formed. The above-described already characteristic wedge-shaped opening between the ends of the winding 13 results as shown in FIG. 13. This wedge-shaped opening is now at least partially closed according to the winding arrangement of the invention by the additional coil side connectors of the phase winding 200. As a result in the arrangement of the invention the noise production is reduced.

The arrangement described in the embodiment of the core 10 with winding 13 is not limited to the embodiment with 36 grooves in the core 10. The arrangement of the winding of the core described here can be extended for example with a further 12 grooves to form another core 10 with a total of 48 grooves N1 to N48 (16-pole stator). In a similar way the windings shown in FIGS. 2, 3, 4 and 7, can be extended by two additional coils respectively, which understandably are connected by the appropriate coil connectors.

The disclosure in German Patent Application 103 29 572.0 of Jun. 30, 2003 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method of making an electromagnetically excitable core of an electrical machine, especially a stator of an alternator, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A method of making an electromagnetically excitable core of an electrical machine with a multiphase winding (13), said method comprising:
    a) preparing core (10) having a substantially parallelepiped shape; which is provided with a plurality of parallel grooves (N1 to N36; N1 to N48) in one side in a first method step; and
    b) in at least one subsequent method step at least three phase windings (100, 200, 300) are laid in said grooves of said core (10) in such manner that only one winding overhang is outside of said core, while other of said at least three phase windings do not have a winding overhang,
    wherein first coil sides of one phase winding are laid in one groove and a part of other coil sides of a first coil of another phase winding are laid in another groove, which is displaced electrically by 60 degrees from said one groove, so that said part of said other coil sides of said first coil form a first physical end of said another phase winding, and a remaining part of said other coil sides of said first coil of said another phase winding are also laid in said another groove but said remaining part of said other coil sides of said first coil form a second physical end of said another phase winding.

2. A method of making an electromagnetically excitable core of an electrical machine with a multiphase winding (13), said method comprising:
    a) preparing core (10) having a substantially parallelepiped shape; which is provided with a plurality of parallel grooves (N1 to N36; N1 to N48) in one side in a first method step; and
    b) in at least one subsequent method step at least three phase windings (100, 200, 300) are laid in said grooves of said core (10) in such manner that only one winding overhang is outside of said core,
    wherein all of said phase windings are wound equally but so that one of said phase windings is laid with first coil sides in one of said grooves, which is spaced electrically about 240 degrees from a first of said grooves.

3. A method of making an electromagnetically excitable core of an electrical machine with a multiphase winding (13), said method comprising:
    a) preparing core (10) having a substantially parallelepiped shape; which is provided with a plurality of parallel grooves (N1 to N36; N1 to N48) in one side in a first method step;
    b) in at least one subsequent method step at least three phase windings (100, 200, 300) are laid in said grooves of said core (10) in such manner that only one winding overhang is outside of said core, whereby said winding overhang is part of only one phase winding, while other of said at least three phase windings do not have a winding overhang; and
    c) thereafter the core (10) with the at least three phase windings (100, 200, 300) is bent circularly.

4. The method as defined in claim 3, wherein each of said at least three phase windings (100, 200, 300) is wound to form a single layer lap winding.

5. The method as defined in claim 3, wherein one of said at least three phase windings (100, 200, 300) with said only one winding overhang is laid closest to a groove slot.

6. The method as defined in claim 3, wherein said at least three phase windings (100, 200, 300) are wound from multiple wire.

7. The method as defined in claim 3, wherein prior to laying said phase windings (100, 200, 300) in said grooves of said core, said phase windings are pressed into a mold, so that said coil sides of said phase windings provided for each of said grooves are shaped according to a groove shape.

8. The method as defined in claim 7, wherein each of said grooves has a groove slot between tooth end strips (43).

9. The method as defined in claim 7, further comprising bending said core (10) to form a circular shaped core and wherein wire of said windings that is arranged furthest radially interiorly in said grooves as groove closure means.

* * * * *